(12) United States Patent
Hatcher (10) Patent No.: US 10,836,299 B2
(45) Date of Patent: Nov. 17, 2020

(54) RATCHET TIE DOWN

(71) Applicant: WINSTON PRODUCTS, LLC, Cleveland, OH (US)

(72) Inventor: Troy Hatcher, Bay Village, OH (US)

(73) Assignee: WINSTON PRODUCTS LLC, Cleveland, OH (US)

( * ) Notice: Subject to any disclaimer, the term of this patent is extended or adjusted under 35 U.S.C. 154(b) by 225 days.

(21) Appl. No.: 15/987,850

(22) Filed: May 23, 2018

(65) Prior Publication Data

US 2018/0339637 A1 Nov. 29, 2018

Related U.S. Application Data

(60) Provisional application No. 62/509,878, filed on May 23, 2017.

(51) Int. Cl.
*B60P 7/08* (2006.01)

(52) U.S. Cl.
CPC .................................. *B60P 7/083* (2013.01)

(58) Field of Classification Search
CPC .............................. B60P 7/083; Y10T 24/2175
See application file for complete search history.

(56) References Cited

U.S. PATENT DOCUMENTS

| | | | |
|---|---|---|---|
| 7,789,603 B2 * | 9/2010 | Huck ...................... | B60P 7/083 410/100 |
| 7,874,047 B2 * | 1/2011 | Breeden .................. | B60P 7/083 24/68 CD |
| 8,099,836 B2 * | 1/2012 | Breeden .................. | B60P 7/083 24/68 CD |
| 9,272,886 B2 * | 3/2016 | Kingery .................. | B60P 7/083 |
| 9,771,015 B2 * | 9/2017 | Yang ....................... | B60P 7/083 |
| 9,884,580 B2 * | 2/2018 | Hemphill .............. | B60P 7/0807 |
| 10,227,030 B2 * | 3/2019 | Kingery .................. | B60P 7/083 |
| 2008/0189921 A1 * | 8/2008 | Tomosue ................. | B60P 7/083 24/68 R |
| 2009/0283729 A1 * | 11/2009 | Carlson ................... | B25B 25/00 254/218 |
| 2011/0119877 A1 * | 5/2011 | Jackson ................ | B60P 7/0823 24/68 CD |
| 2015/0128388 A1 * | 5/2015 | Mastbeth ................ | B60P 7/083 24/68 CD |
| 2018/0141479 A1 * | 5/2018 | Anderson ............... | B60P 7/083 |

* cited by examiner

*Primary Examiner* — Robert Sandy
*Assistant Examiner* — Louis A Mercado
(74) *Attorney, Agent, or Firm* — Tucker Ellis LLP (57) ABSTRACT

Provided is a ratchet tie down including a main body portion, a reel assembly rotatable relative to the main body portion, a first sprocket surrounding the reel assembly, a second sprocket surrounding the reel assembly, at least one first noise reduction disk, at least one second noise reduction disk, and a release pawl biased in a locked position to land on the noise reduction disks to dampen the sound as the release pawl engages teeth of the sprockets.

20 Claims, 8 Drawing Sheets

RATCHET TIE DOWN

RELATED APPLICATIONS

This application claims the benefit of U.S. Provisional Application No. 62/509,878 filed May 23, 2017, which is hereby incorporated herein by reference.

FIELD OF INVENTION

The present invention relates generally to a ratchet tie down for attachment to an object.

BACKGROUND

A ratchet tie down can be used to secure a wide variety of objects to various support surfaces and/or to various other objects. A ratchet tie down has a ratcheting mechanism and a webbing with at least one extendable end. In one example, a ratchet tie down can include two webbing assemblies, including one webbing assembly of a fixed, non-extendable length and another webbing assembly that is extendable to make the ratchet tie down adjustable to a wide variety of lengths. The distal ends of both webbing assemblies can be attached to suitable anchor points on an object or surface. The ratcheting mechanism can then be used to remove any slack in the webbing assemblies and apply tension to ensure that the object to be secured is retained securely.

SUMMARY OF INVENTION

The present application provides a ratchet tie down including a main body portion, a reel assembly rotatable relative to the main body portion, a first sprocket surrounding the reel assembly, a second sprocket surrounding the reel assembly, at least one first noise reduction disk, at least one second noise reduction disk, and a release pawl biased in a locked position to land on the noise reduction disks to dampen the sound as the release pawl engages teeth of the sprockets.

According to an embodiment, a ratchet tie down is provided that includes a main body portion having a base and first and second sides extending from the base, a reel assembly rotatable relative to the main body portion, a handle assembly rotatable relative to the main body portion, the handle assembly including first and second rail arms spaced from one another and a handle attached to the first and second rail arms, a first sprocket through which the reel assembly extends, the first sprocket disposed between the first side of the main body portion and the first rail arm and including a plurality of teeth, a second sprocket through which the reel assembly extends, the second sprocket disposed between the second side of the main body portion and the second rail arm and including a plurality of teeth, at least one first noise reduction disk through which the reel assembly extends, the at least one first noise reduction disk positioned adjacent to the first sprocket between the first side of the main body portion and the first rail arm; at least one second noise reduction disk through which the reel assembly extends, the at least one second noise reduction disk positioned adjacent to the second sprocket between the second side of the main body portion and the second rail arm, and a release pawl movable from a locked position to an unlocked position, the release pawl being biased in the locked position to land on the noise reduction disks and engage the teeth of the first and second sprockets.

According to another embodiment, a ratchet tie down is provided that includes a main body portion, a reel assembly rotatable relative to the main body portion, a handle assembly having first and second rail arms rotatable relative to the main body portion, a first sprocket surrounding the reel assembly between the main body portion and the first rail arm, a second sprocket surrounding the reel assembly between the main body portion and the second rail arm, at least one first noise reduction disk adjacent to the first sprocket between the main body portion and the first rail arm, at least one second noise reduction disk adjacent to the second sprocket between the main body portion and the second rail arm, and a release pawl biased in a locked position to land on the noise reduction disks and engage teeth of the sprockets.

According to still another embodiment, a ratchet tie down is provided that includes a main body portion having a base and first and second sides extending from the base, a reel assembly rotatable relative to the main body portion, a handle assembly rotatable relative to the main body portion, the handle assembly including first and second rail arms spaced from one another and a handle attached to the first and second rail arms, the first and second rail arms each including an overmolded bumper covering at least a portion of a periphery of the rail arms, a first sprocket through which the reel assembly extends, the first sprocket disposed between the first side of the main body portion and the first rail arm and including a plurality of teeth, a second sprocket through which the reel assembly extends, the second sprocket disposed between the second side of the main body portion and the second rail arm and including a plurality of teeth, a release pawl movable from a locked position to an unlocked position.

The foregoing and other features of the application are described below with reference to the drawings.

DETAILED DESCRIPTION

Turning initially to FIGS. 1-6, a ratchet tie down is shown generally at reference numeral 10. The ratchet tie down 10 includes a main body portion 12, a reel assembly 14, a lever arm assembly 16, a release pawl 18, and a lock pawl 20. The ratchet tie down is shown generally in a storage position where a first webbing 22 (FIG. 9) can be wound about the reel assembly 14.

Figure 7:
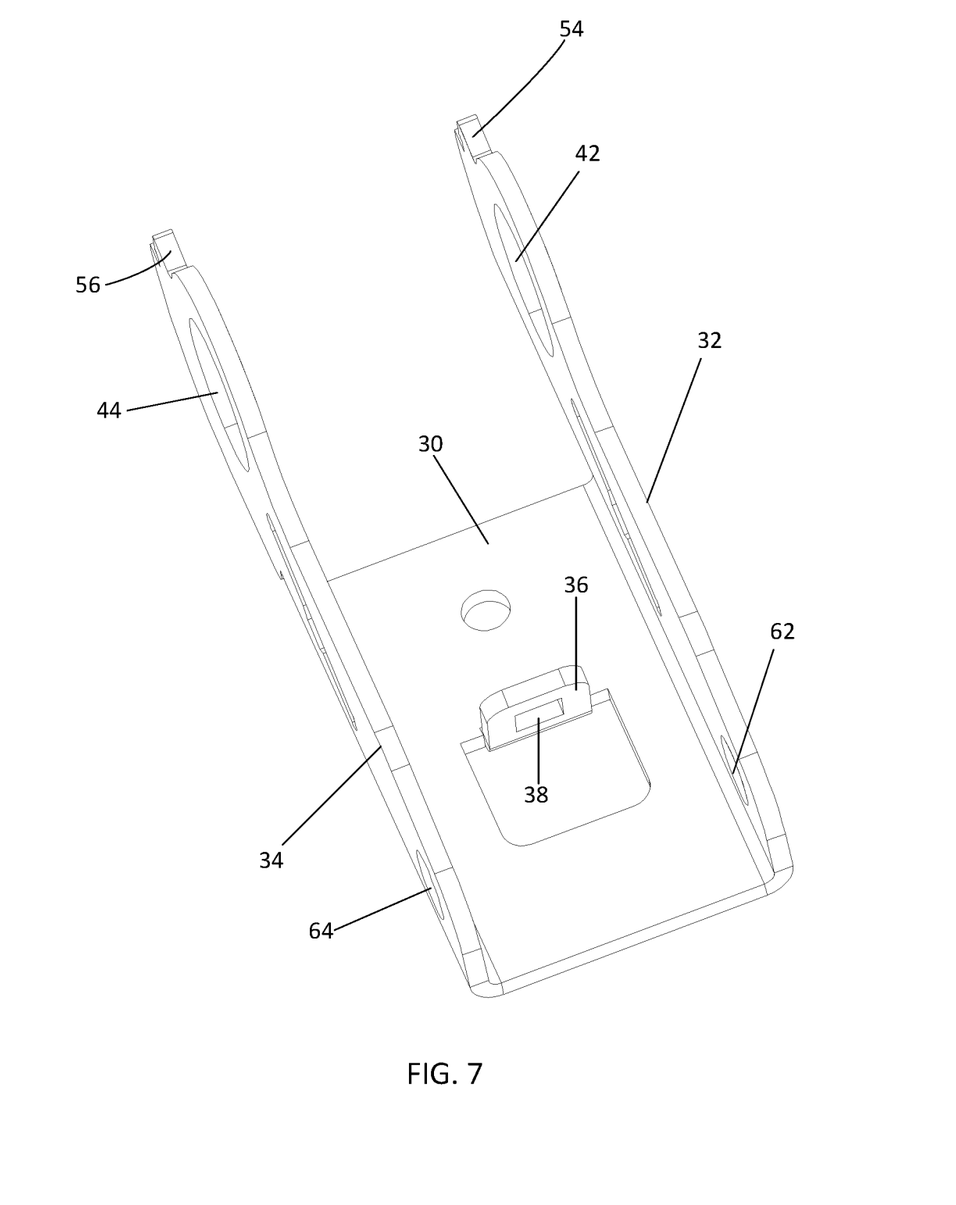
FIG. 7 is a perspective view of a main body portion of the ratchet tie down.

Referring additionally to FIG. 7, the main body portion 12 has a base 30 and first and second sides 32 and 34 extending from the base 30. The base includes an upward projection 36 configured to serve as a spring seat and has an opening 38 for receiving a projection 40 of the lock pawl 20. Each of the first and second sides 32 and 34 includes a respective opening 42, 44 through which the reel assembly 14 extends and a respective slot 46, 48 through which respective arms 50, 52 of the lock pawl 20 extends. The sides 32 and 34 also each have a stop 54, 56 to inhibit movement of the lever arm assembly 16, one or more detents 58, 60 spaced from the stop 54, 56, and a respective opening 62,64 through which a webbing pin 66 extends to attach a second webbing to the main body portion 12.

Figure 6:
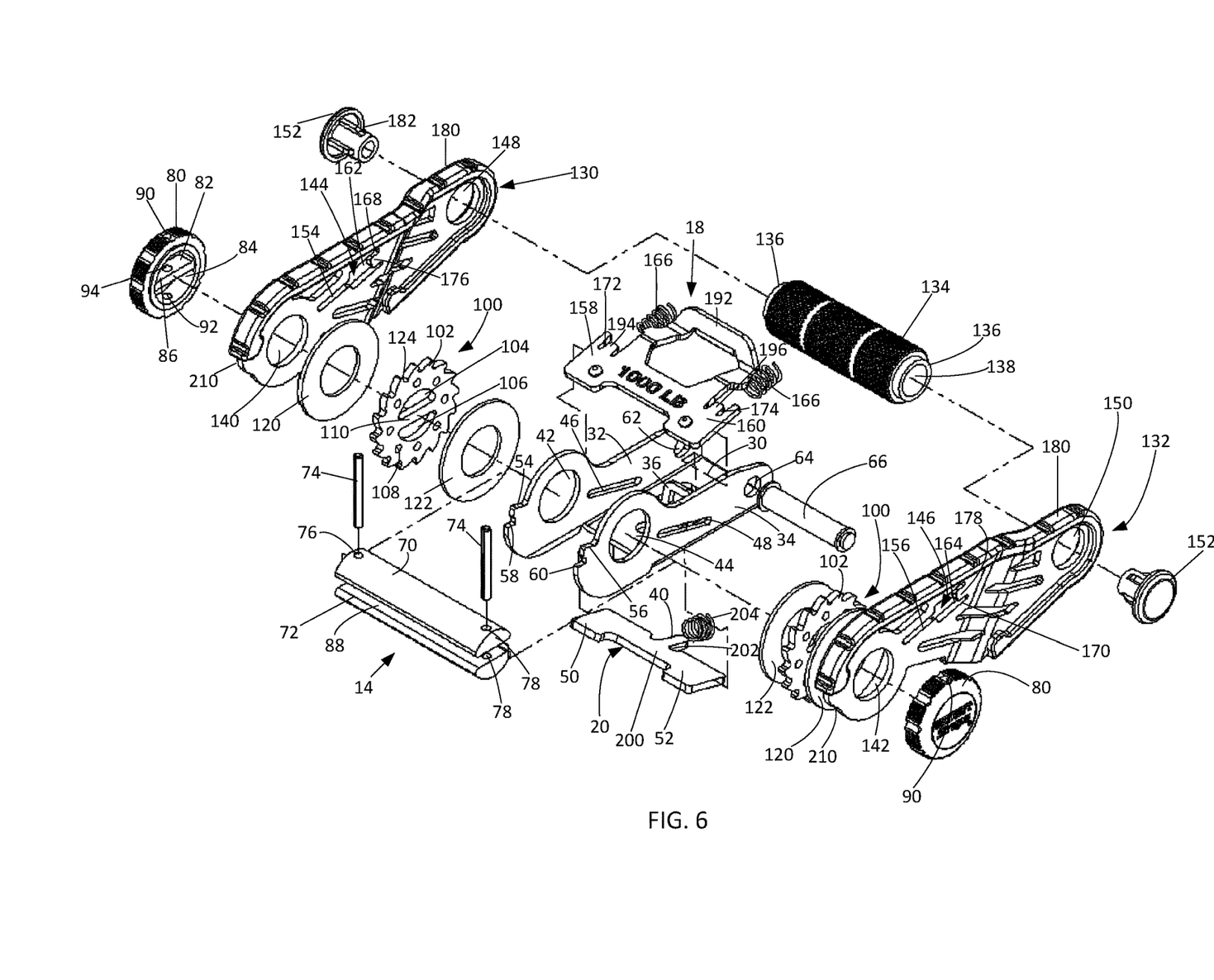
FIG. 6 is an exploded view of the ratchet tie down.

Referring now to the reel assembly 14, the reel assembly 14 is disposed within the main body portion 12 and includes ends extending through the openings 42 and 44 in the first and second sides 32 and 34. The reel assembly 14 may be one piece or may include multiple pieces, such as the first and second reel elements 70 and 72 as shown. The reel elements 70 and 72 are attached to one another by fasteners 74, such as the pins as shown, that are received in first and second openings 76 and 78 at opposite ends of each of the reel elements 70 and 72. The first and second openings 76 and 78 are provided at the ends such that the openings 76 and 78 are outside of a respective arm rail of the lever arm assembly to receive the pins 74 outside of the rails.

Figure 9:
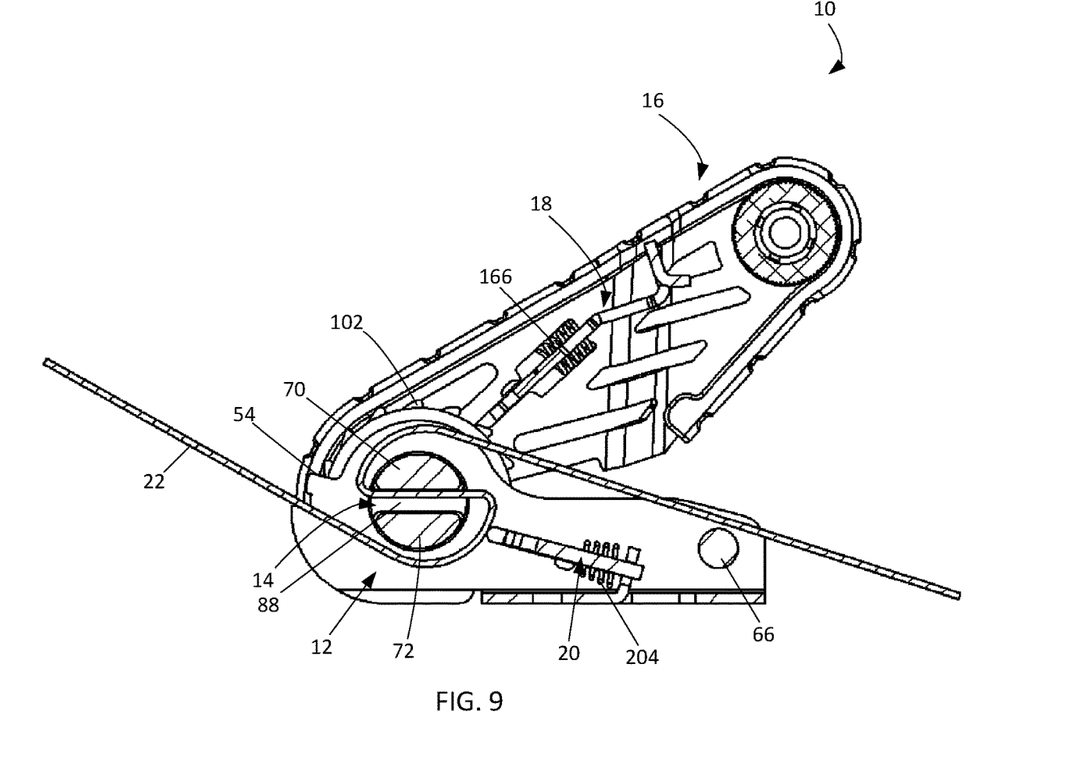
FIG. 9 is a cross-sectional view taken about line 9-9 in FIG. 8.

End caps 80 can be attached to the reel elements 70 and 72 for maintaining positioning of the reel elements 70 and 72. For example, either or both of the end caps 80 can include apertures 82 and 84 extending partially into or completely therethrough for receiving a portion of the reel elements 70 and 72. The apertures 82 and 84 can be spaced a distance apart, such as by an intermediate wall 86, to space the reel elements 70 and 72 a distance apart from each other to form a reel aperture 88 sized and shaped for the first webbing 22 to extend through as shown in FIG. 9. The end caps 80 can include one or more opening for receiving the pins 74, and as illustrated an opening 90 at the tops, an opening 92 at the bottoms, and an opening 94 in the walls 86 of the ends caps for receiving the pins 74. In an embodiment, the end caps 80 can have detents that engage in the openings 76 and 78 in the reel assembly 14. The end caps can each also include a bushing section disposed in the respective opening in the arm rails of the lever arm assembly 16 to serve as a bushing between the reel elements 70 and 72 and the arm rails.

To wind the first webbing 22 about the reel assembly 14, the ratchet tie down device 10 includes a pair of sprockets 100 having a plurality of ratchet teeth 102. As shown the sprockets 100 include more teeth than conventional ratchets, for example fifteen teeth, that provide for fine tuning adjustments to the tie down. Each sprocket 100 also includes openings 104 and 106 extending therethrough for receiving a portion of the reel elements 70 and 72 and a plurality of circumferentially spaced openings 108 providing weight reduction. The openings 104 and 106 can be spaced a distance apart, such as by an intermediate wall 110, to space the reel elements 70 and 72 a distance apart from each other.

The ratchet tie down 10 also includes one or more noise reduction disk, and as shown a pair of noise reduction disks 120 and 122 on opposite sides of each sprocket 100. The noise reduction disks 120 and 122 may be made of a suitable soft material to dampen the sound of the release pawl 18 and lock pawl 20 as they move into engagement the with teeth 102 towards roots 124 of the teeth 102. The release pawl 18 and lock pawl 20 therefore land on the noise reduction disks 120 and 122 and compress the disks and then are engaged by the teeth 102 to prevent movement. The noise reduction disks 120 and 122 thereby each have an outer diameter greater than a diameter of the sprockets 100 at the roots 124 of the teeth 102.

When assembled, one of the sprockets 100 and the respective noise reduction disks 120 and 122 surround the reel assembly 14 between the first side 32 of the main body portion 12 and the respective arm rail of the lever arm assembly 16, and the other of the sprockets 100 and the respective noise reduction disks 120 and 122 surround the reel assembly 14 between the second side 34 of the main body portion 12 and the respective arm rail of the lever arm assembly 16. The sprockets 100 are rotatable relative to the main body portion 12 when the release pawl 18 is in the locked position generally together with the lever arm assembly 16.

Referring now to the lever arm assembly 16, the lever arm assembly 16 is rotatable relative to the main body portion 12 to various positions, such as the positions shown in FIGS. 8-13 as discussed in detail below. The lever arm assembly 16 includes first and second lever arm rails 130 and 132 and a handle 134 attached to the rails 130 and 132. The handle 134 can include a knurled surface for gripping by a user, and includes flanged portion 136 at either ends and openings 138 extending therethrough. The first and second lever arm rails 130 and 132 each include a respective opening 140, 142 that aligns with the respective opening 42, 44 in the main body portion 12 for the reel assembly 14 to extend through, a slot 144, 146 through which a respective arm of the release pawl 18 extends, and an opening 148, 150 that receives the flanged portion 136 of the handle 134 and a respective handle lock cap 152.

Each slot 144 and 146 includes a respective first portion 154, 156 that receives a respective arm 158, 160 of the release pawl 18, and a respective second portion 162, 164 that receives the respective arm 158, 160 of the release pawl 18 and a biasing member, such as spring 166 that biases the release pawl 18 in a locked position. A spring seat 168, 170 is formed in each lever arm rail 130, 132 for receiving one end of the respective spring 166 in the slot 144, 146, and a spring seat 172, 174 is formed the arms 158 and 160 of the release pawl 18 for receiving the other end of the respective spring 166. Each lever arm rail 130 and 132 includes a projection 176, 178 extending into the respective second portion 162, 164 of the slot that extends partially through the spring 166 to hold the spring 166 in position.

The first and second lever arm rails 130 and 132 can each include a bumper 180 around edges thereof, such as a rubber or plastic bumper that may be attached in any suitable manner, such as by overmolding. The bumpers 180 prevent or reduce wear and damage to cargo and/or the vehicle caused by ratchets contacting the cargo/vehicle, such as due to vibration or movement during loading. The bumpers 180 also reduce or eliminate damages to the edges of the lever arm rails 130 and 132. The lever arms rails 130 and 132 can also include one or more cutouts extending partially or completely through the lever arms.

To attach the handle 134 to the lever arm rails 130 and 132, the handle 134 is positioned between the first and second lever arm rails 130 and 132 with the flanged portions 136 positioned within the openings 148 and 150. The handle lock caps 152 are then inserted through the openings 148 and 150 in the lever arm rails 130 and 132 and into the openings 138 in the handle 134 extending through the flanged portions 136. The handle lock caps 152 can include one or more protrusions 182, and as shown a plurality of circumferentially spaced protrusions 182 that create an interference fit between the lock caps 152 and the handle 134.

Referring now to the release pawl 18, the release pawl 18 includes a body 190 having the arms 158 and 160 and a handle 192 extending upward from the body 190 for a user to grasp to move the release pawl 18 from the locked position to an unlocked position. The release pawl 18 can have a weight limit integrated therein as shown in FIG. 6 to provide a permanent indication of the working load limit. As noted above, the spring seats 172 and 174 are formed in each arm 158, 160 to seat an end of one of the springs 166, and a back side of each arm includes a projection 194, 196 extending partially through the spring 166 to hold the spring in position. The handle 192 is not directly in line with the springs 166 which reduces play between the release pawl 18 and the slot to reduce noise, and the springs 166 urge the pawl 18 toward the sprocket center.

The arms 158 and 160 of the release pawl 18 are biased by the springs 166 to engage with the sprockets 100 and the noise reduction disks 120 and 122 to drive rotation of the sprockets 100 to wind the first webbing 22 about the reel assembly 14. When the lever arm assembly 16 is rotated toward the reel assembly 14 with the release pawl 18 in the locked position, the arms 158 and 160 will be in contact with the teeth 102 and drive the rotation of the sprockets 100 to wind the first webbing 22 about the reel assembly 14. The lever arm assembly 16 can be moved until the release pawl engages the stops 54 and 56. To move the lever arm assembly 16 past the stops 54 and 56, the user pulls the release pawl 18 against the springs 166 to lift the arms 158 and 160 over the stops 54 and 56 to allow movement toward the detents 58 and 60. When the lever arm assembly 16 is rotated in the opposite direction, the resilient bias of release pawl 18 will permit the arms 158 and 160 to move past the teeth 102 without causing rotation of the sprockets 100.

Referring now to the lock pawl 20, the lock pawl 20 includes a body 200 having the arms 50 and 52, a spring seat 202 to seat an end of a spring 204, and the projection 40 extending partially through the spring 204 to hold the spring 204 in position. The projection 40 extends through the opening 38 in the upward projection 36 of the base 30 to allow the lock pawl 18 to be guided by and held in position relative to the base 30.

The arms 50 and 52 of the lock pawl 20 are biased by the spring 204 to a locked position to engage with the sprockets 100 and the noise reduction disks 120 and 122 to inhibit unwinding of the first webbing 22 about the reel assembly 14. When the lever arm assembly 16 is rotated relative to the main body portion 12 from a first position shown in FIG. 1 toward a second position while the release pawl is in the locked position, the lock pawl 20 is moved from the locked position by the teeth 102 until the arms 50 and 52 have passed the teeth 102 and are moved by the spring 204 to the locked position. When the lever arm assembly 16 is rotated in the opposite direction or when stationary, the lock pawl 20 will prevent rotation of the sprockets in the opposite direction. When it is desired to unwind the first webbing 22, the lever assembly 16 can be positioned such that cams 210 on the lever arm rails 130 and 132 engage the lock pawl 20 to disengage the lock pawl 20 from the teeth 102 of the sprockets 100.

Figure 1:
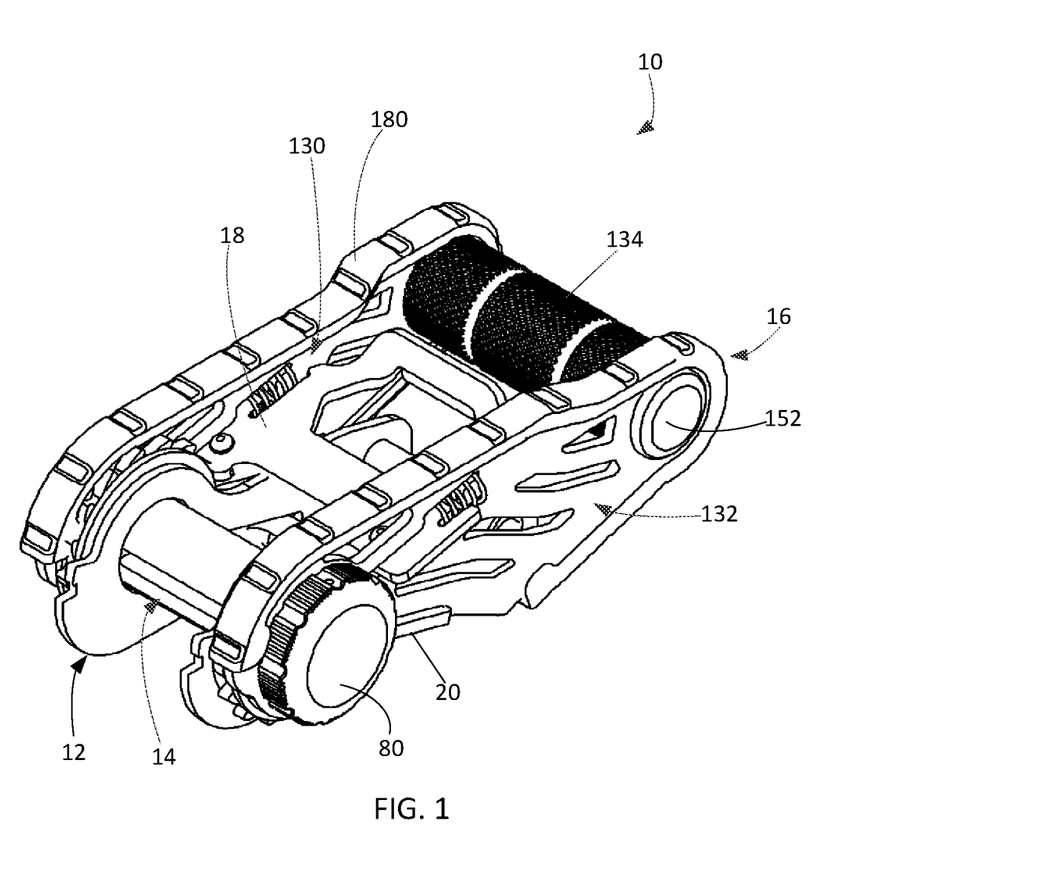
FIG. 1 is a perspective view of an exemplary ratchet tie down.
Figure 2:
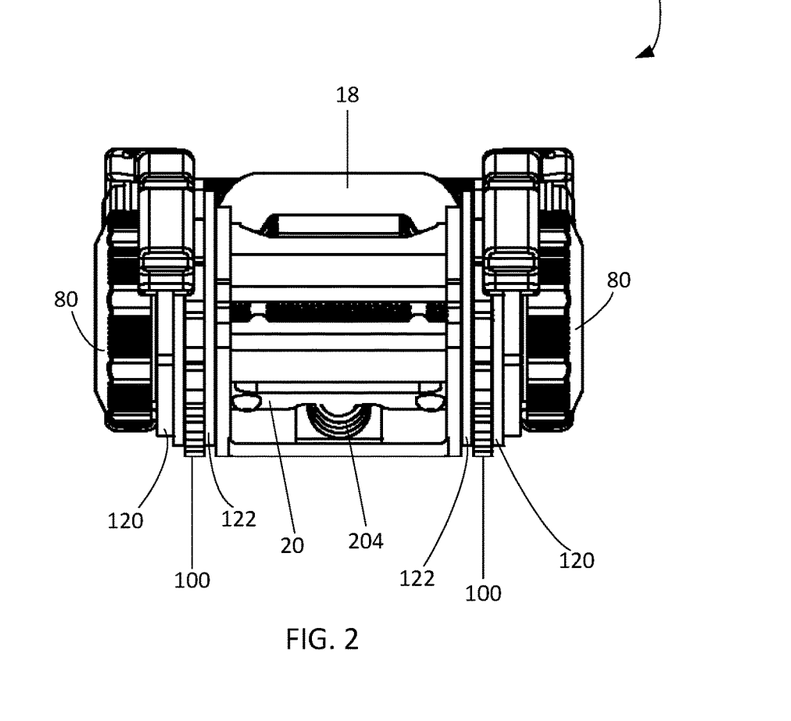
FIG. 2 is a front view of the ratchet tie down.
Figure 3:
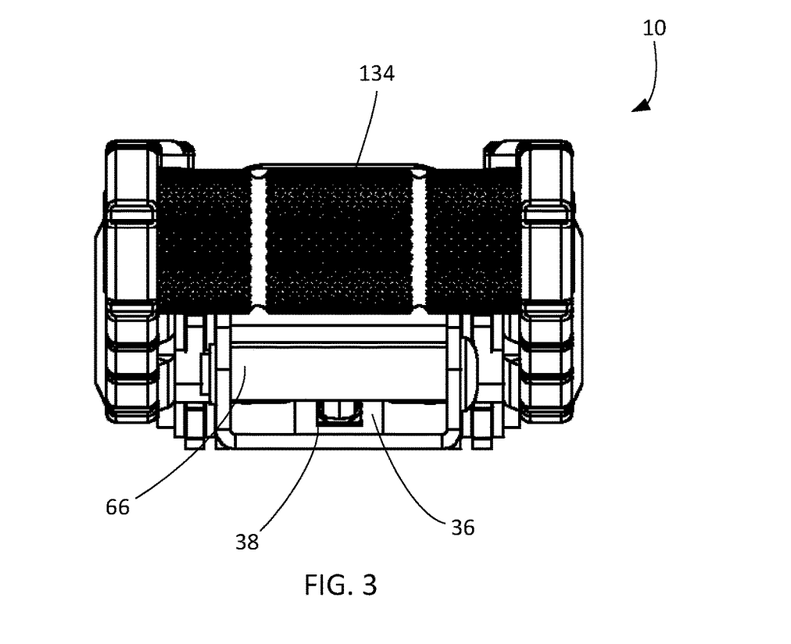
FIG. 3 is a rear view of the ratchet tie down.
Figure 4:
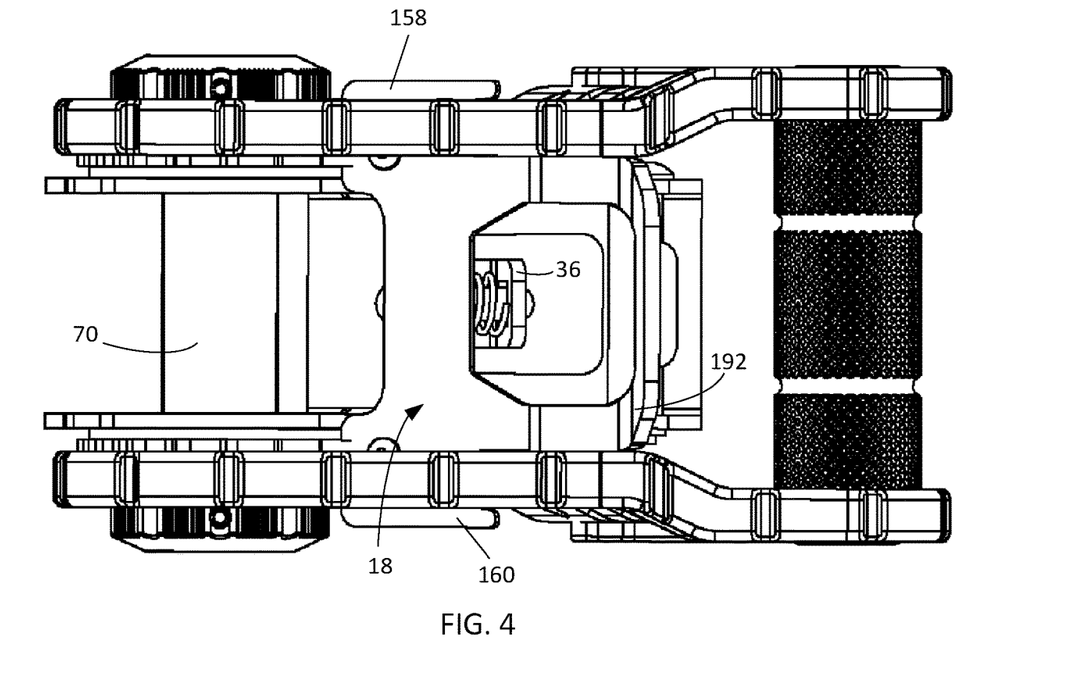
FIG. 4 is a top view of the ratchet tie down.
Figure 5:
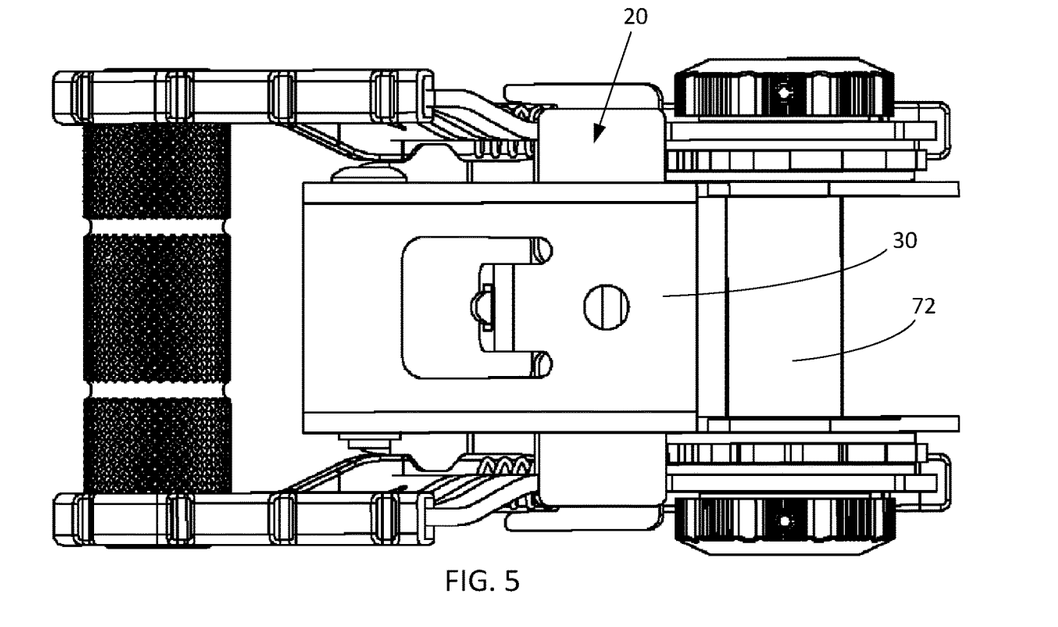
FIG. 5 is a bottom view of the ratchet tie down.
Figure 8:
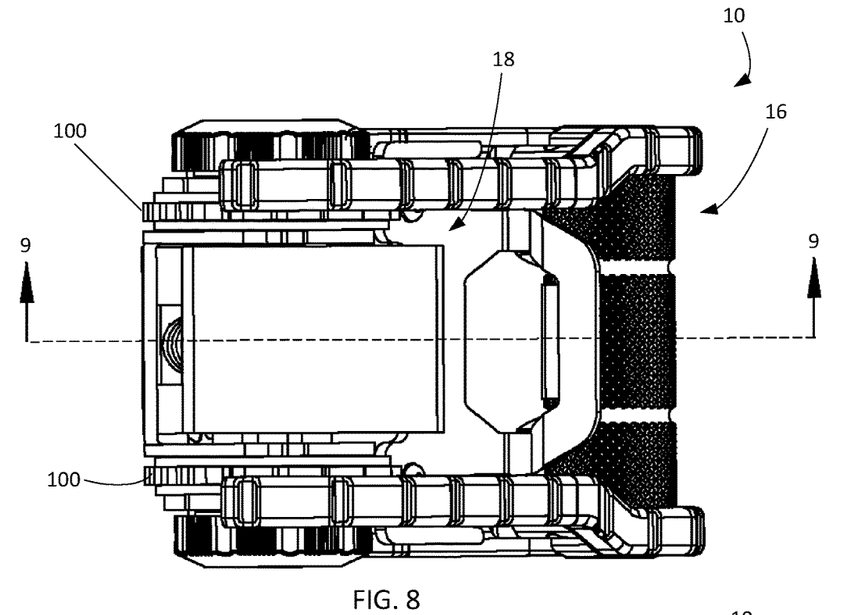
FIG. 8 is a top view of the ratchet tie down in a second position.
Figure 10:
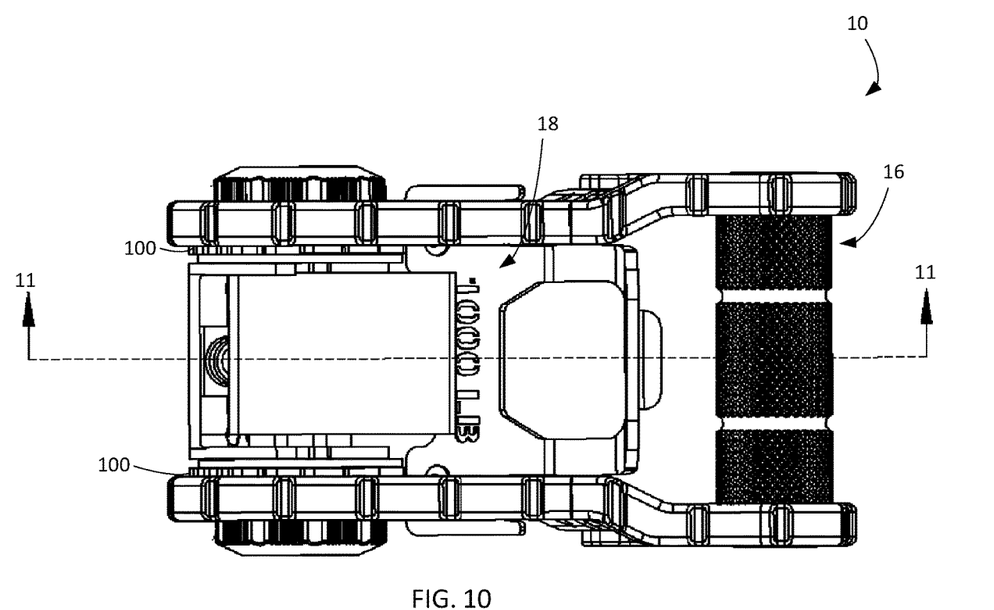
FIG. 10 is a top view of the ratchet tie down in a third position.
Figure 11:
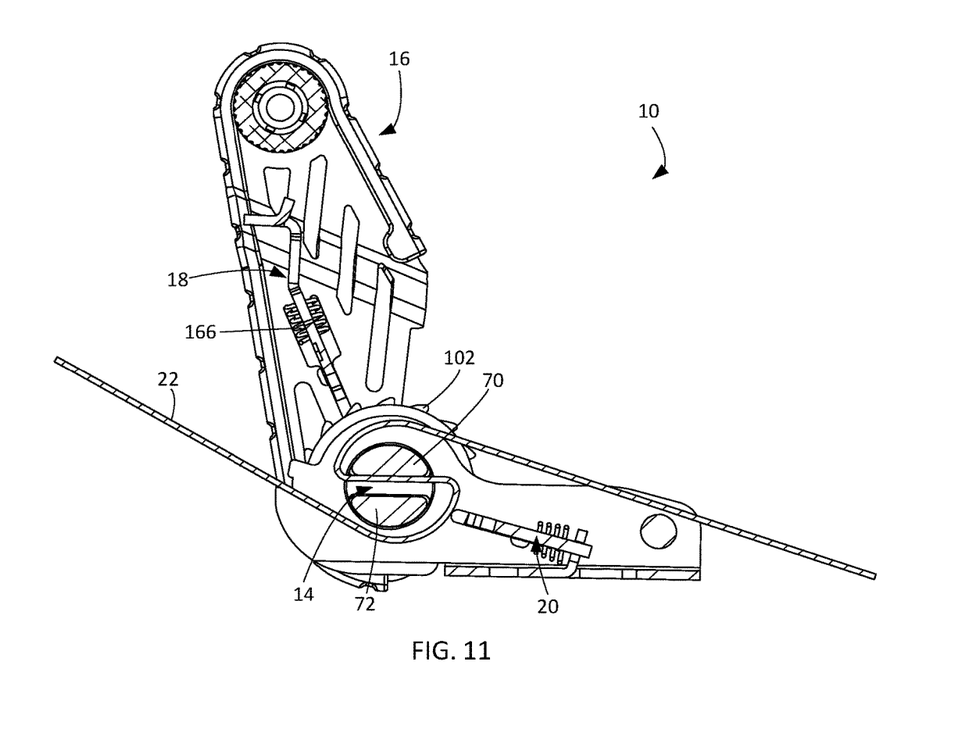
FIG. 11 is a cross-sectional view taken about line 11-11 in FIG. 10.
Figures 12, 13:
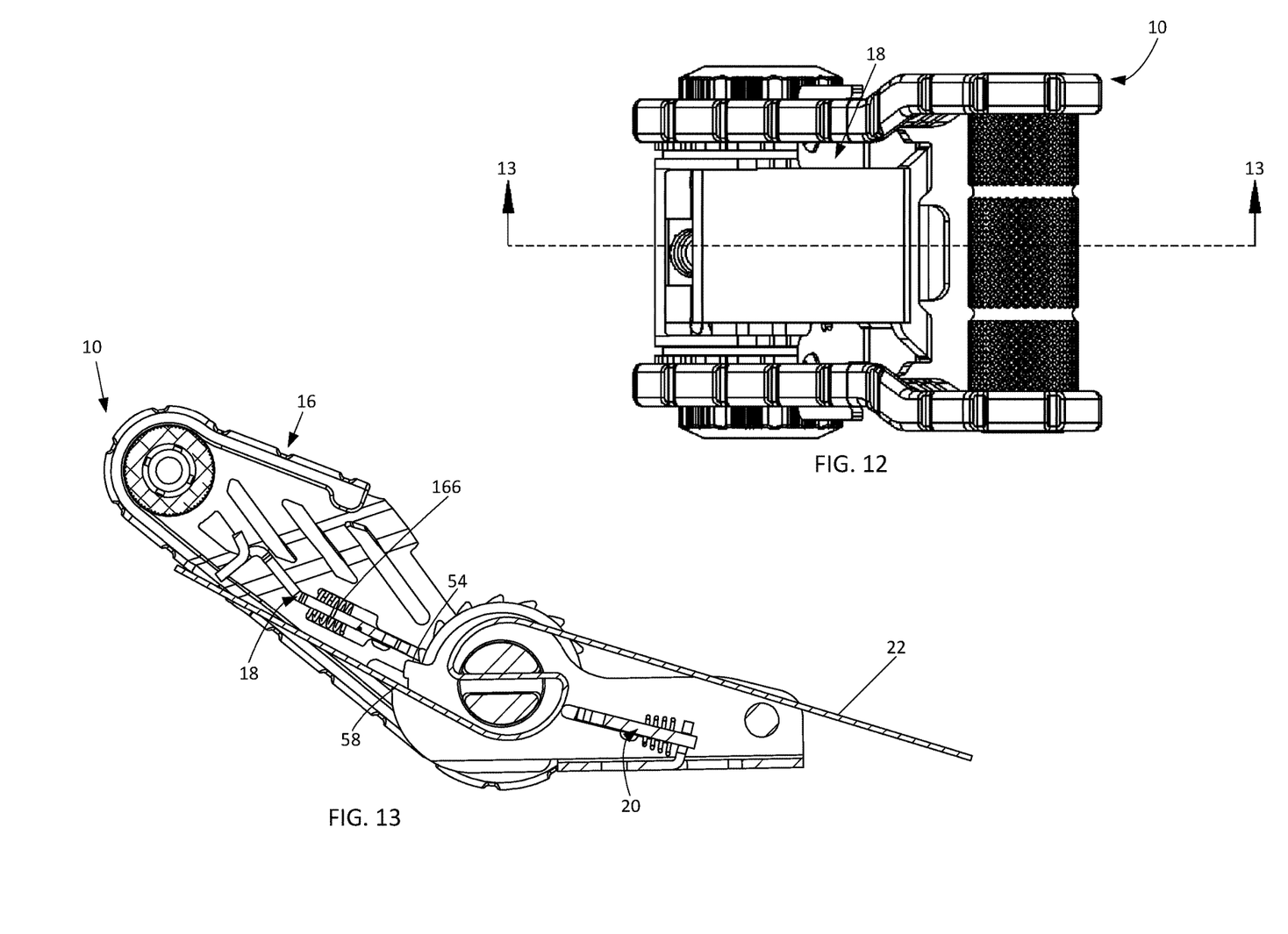
FIG. 12 is a top view of the ratchet tie down in a fourth position.
FIG. 13 is a cross-sectional view taken about line 13-13 in FIG. 12.

Referring now to FIGS. 8-13, the lever arm assembly 16 can be rotatable between various positions, such as the storage position or first position shown in FIG. 1, a second position shown in FIGS. 8 and 9, a third position shown in FIGS. 10 and 11, and a fourth position shown in FIGS. 12 and 13.

When it is desired to wind the first webbing 22 about the reel assembly 14 in an incremental manner, a user can utilize the lever arm assembly 16, sprockets 100, and the release pawl 18 to drive the rotation of the reel assembly 14. To drive the sprockets 100, the user can move the lever arm assembly 16 relative to the main body portion 12, from the first position shown in FIG. 1 to the second position shown in FIG. 9, to the third position shown in FIG. 11, and then to the fourth position shown in FIG. 13 where the release pawl 18 contacts the stops 54 and 56, and back repeatedly until a desired retraction of the first webbing 22 has been achieved. The user can wind the first webbing 22 about the reel assembly 14 in an incremental manner to remove slack from the first webbing 22 and/or to gradually apply tension to the first webbing 22 for securing an object or the like. By providing an increased tooth count on the sprockets 100, the tensioning can be fine-tuned.

When it is desired to unwind the first webbing 22, a user can move the release pawl 18 against the springs 166 to disengage the arms 158 and 160 from the teeth and move the release pawl 18 over the stops 54 and 56 towards the detents 58 and 60. When the release pawl is released and the springs 166 move the release pawl to its biased position, the release pawl will be trapped within the detents 58 and 60 until the release pawl 18 is moved against the springs 166. When the release pawl 18 is trapped within the detents 58 and 60, the cams 210 on the lever arm rails 130 and 132 engage the lock pawl 20 to disengage the lock pawl 20 from the teeth 102 of the sprockets 100.

Although certain embodiments have been shown and described, it is understood that equivalents and modifications falling within the scope of the appended claims will occur to others who are skilled in the art upon the reading and understanding of this specification.

What is claimed is:

1. A ratchet tie down comprising:
    a main body portion having a base and first and second sides extending from the base;
    a reel assembly rotatable relative to the main body portion;
    a handle assembly rotatable relative to the main body portion, the handle assembly including first and second rail arms spaced from one another and a handle attached to the first and second rail arms;
    a first sprocket through which the reel assembly extends, the first sprocket disposed between the first side of the main body portion and the first rail arm and including a plurality of teeth;
    a second sprocket through which the reel assembly extends, the second sprocket disposed between the second side of the main body portion and the second rail arm and including a plurality of teeth;
    at least one first noise reduction disk through which the reel assembly extends, the at least one first noise reduction disk positioned adjacent to the first sprocket between the first side of the main body portion and the first rail arm;
    at least one second noise reduction disk through which the reel assembly extends, the at least one second noise reduction disk positioned adjacent to the second sprocket between the second side of the main body portion and the second rail arm; and
    a release pawl movable from a locked position to an unlocked position, the release pawl being biased in the locked position to land on the noise reduction disks and engage the teeth of the first and second sprockets, wherein the at least one first noise reduction disk includes a pair of first noise reduction disks, one of the first noise reduction disks being adjacent each side of the first sprocket, and the at least one second noise reduction disk includes a pair of second noise reduction disks, one of the second noise reduction disks being adjacent each side of the second sprocket.

2. The ratchet tie down according to claim 1, wherein the release pawl is configured to compress the at least one first and second noise reduction disks.

3. The ratchet tie down according to claim 1, wherein the at least one first and second noise reduction disks each have an outer diameter greater than a diameter of the first and second sprockets at roots of the teeth of the sprockets.

4. The ratchet tie down according to claim 1, wherein the first and second sprockets each include more than ten teeth.

5. The ratchet tie down according to claim 1, wherein the first and second rail arms each include an overmolded bumper covering at least a portion of a periphery of the rail arms.

6. The ratchet tie down according to claim 1, wherein the handle includes a knurled surface and flanged portions on either end that are received in openings in the first and second rail arms.

7. The ratchet tie down according to claim 1, wherein the first and second rail arms each include a slot extending therethrough for receiving a respective arm of the release pawl, wherein each slot includes a first portion that receives the respective arm, and a second portion that receives the respective arm and a respective biasing member.

8. The ratchet tie down according to claim 7, wherein the first and second rail arms each include a projection extending into the respective second portion that extends partially through the respective biasing member.

9. A ratchet tie down comprising:
a main body portion having a base and first and second sides extending from the base;
a reel assembly rotatable relative to the main body portion;
a handle assembly rotatable relative to the main body portion, the handle assembly including first and second rail arms spaced from one another and a handle attached to the first and second rail arms, the handle including a knurled surface and flanged portions on either end that are received in openings in the first and second rail arms;
a first sprocket through which the reel assembly extends, the first sprocket disposed between the first side of the main body portion and the first rail arm and including a plurality of teeth;
a second sprocket through which the reel assembly extends, the second sprocket disposed between the second side of the main body portion and the second rail arm and including a plurality of teeth;
at least one first noise reduction disk through which the reel assembly extends, the at least one first noise reduction disk positioned adjacent to the first sprocket between the first side of the main body portion and the first rail arm;
at least one second noise reduction disk through which the reel assembly extends, the at least one second noise reduction disk positioned adjacent to the second sprocket between the second side of the main body portion and the second rail arm; and a release pawl movable from a locked position to an unlocked position, the release pawl being biased in the locked position to land on the noise reduction disks and engage the teeth of the first and second sprockets, wherein the release pawl includes a body having arms each with a front side for engaging the sprockets and a backside having a projection that extends into a biasing member that biases the release pawl in the locked position.

10. A ratchet tie down comprising:
a main body portion having a base and first and second sides extending from the base;
a reel assembly rotatable relative to the main body portion;
a handle assembly rotatable relative to the main body portion, the handle assembly including first and second rail arms spaced from one another and a handle attached to the first and second rail arms, the handle including a knurled surface and flanged portions on either end that are received in openings in the first and second rail arms;
a first sprocket through which the reel assembly extends, the first sprocket disposed between the first side of the main body portion and the first rail arm and including a plurality of teeth;
a second sprocket through which the reel assembly extends, the second sprocket disposed between the second side of the main body portion and the second rail arm and including a plurality of teeth;
at least one first noise reduction disk through which the reel assembly extends, the at least one first noise reduction disk positioned adjacent to the first sprocket between the first side of the main body portion and the first rail arm;
at least one second noise reduction disk through which the reel assembly extends, the at least one second noise reduction disk positioned adjacent to the second sprocket between the second side of the main body portion and the second rail arm;
a release pawl movable from a locked position to an unlocked position, the release pawl being biased in the locked position to land on the noise reduction disks and engage the teeth of the first and second sprockets; and
a pair of handle lock caps each having a plurality of circumferentially spaced protrusions that are received in openings in the flanged portions and the first and second rail arms to secure the handle to the rail arms.

11. A ratchet tie down comprising:
a main body portion;
a reel assembly rotatable relative to the main body portion;
a handle assembly having first and second rail arms rotatable relative to the main body portion;
a first sprocket surrounding the reel assembly between the main body portion and the first rail arm;
a second sprocket surrounding the reel assembly between the main body portion and the second rail arm;
at least one first noise reduction disk adjacent to the first sprocket between the main body portion and the first rail arm;
at least one second noise reduction disk adjacent to the second sprocket between the main body portion and the second rail arm; and
a release pawl biased in a locked position to land on the noise reduction disks and engage teeth of the sprockets,
wherein the at least one first noise reduction disk includes a pair of first noise reduction disks, one of the first noise reduction disks being adjacent each side of the first sprocket, and the at least one second noise reduction disk includes a pair of second noise reduction disks, one of the second noise reduction disks being adjacent each side of the second sprocket.

12. The ratchet tie down according to claim 11, wherein the release pawl is configured to compress the at least one first and second noise reduction disks.

13. The ratchet tie down according to claim 11, wherein the at least one first and second noise reduction disks each have an outer diameter greater than a diameter of the first and second sprockets at roots of the teeth of the sprockets.

14. The ratchet tie down according to claim 11, wherein the first and second sprockets each include more than ten teeth.

15. The ratchet tie down according to claim 14, wherein the first and second sprockets each include fifteen teeth.

16. A ratchet tie down comprising:
a main body portion;
a reel assembly rotatable relative to the main body portion;
a handle assembly having first and second rail arms rotatable relative to the main body portion;
a first sprocket surrounding the reel assembly between the main body portion and the first rail arm;
a second sprocket surrounding the reel assembly between the main body portion and the second rail arm;
at least one first noise reduction disk adjacent to the first sprocket between the main body portion and the first rail arm;
at least one second noise reduction disk adjacent to the second sprocket between the main body portion and the second rail arm; and
a release pawl biased in a locked position to land on the noise reduction disks and engage teeth of the sprockets, wherein the first and second rail arms each include an overmolded bumper covering at least a portion of a periphery of the rail arms.

17. A ratchet tie down comprising:
a main body portion having a base and first and second sides extending from the base;
a reel assembly rotatable relative to the main body portion;
a handle assembly rotatable relative to the main body portion, the handle assembly including first and second rail arms spaced from one another and a handle attached to the first and second rail arms, the first and second rail arms each including an overmolded bumper covering at least a portion of a periphery of the rail arms;
a first sprocket through which the reel assembly extends, the first sprocket disposed between the first side of the main body portion and the first rail arm and including a plurality of teeth;
a second sprocket through which the reel assembly extends, the second sprocket disposed between the second side of the main body portion and the second rail arm and including a plurality of teeth;
a release pawl movable from a locked position to an unlocked position;
at least one first noise reduction disk through which the reel assembly extends, the at least one first noise reduction disk positioned adjacent to the first sprocket between the first side of the main body portion and the first rail arm; and
at least one second noise reduction disk through which the reel assembly extends, the at least one second noise reduction disk positioned adjacent to the second sprocket between the second side of the main body portion and the second rail arm,
wherein the release pawl is biased in the locked position to land on the noise reduction disks.

18. The ratchet tie down according to claim 17, wherein the release pawl includes a body having arms each with a front side for engaging the sprockets and a backside having a projection that extends into a biasing member that biases the release pawl in the locked position.

19. The ratchet tie down according to claim 17, wherein the at least one first and second noise reduction disks each have an outer diameter greater than a diameter of the first and second sprockets at roots of the teeth of the sprockets.

20. The ratchet tie down according to claim 17, wherein the at least one first noise reduction disk includes a pair of first noise reduction disks, one of the first noise reduction disks being adjacent each side of the first sprocket, and the at least one second noise reduction disk includes a pair of second noise reduction disks, one of the second noise reduction disks being adjacent each side of the second sprocket.

* * * * *